G. WATKINSON,

Assignor to L. CANDEE & Co.

India Rubber Boots.

No. 8,587. Reissued Feb. 18, 1879.

Witnesses:

J. H. Chumway.

Jas. C. Earle

Geo. Watkinson,

Inventor.

By Atty:

Wm. D. Earle

N. PETERS, PHOTO-LITHOGRAPHER, WASHINGTON, D. C.

UNITED STATES PATENT OFFICE.

GEORGE WATKINSON, OF NEW HAVEN, CONNECTICUT, ASSIGNOR TO THE L. CANDEE & CO.

IMPROVEMENT IN INDIA-RUBBER BOOTS.

Specification forming part of Letters Patent No. 209,312, dated October 22, 1878; Reissue No. 8,587, dated February 18, 1879; application filed January 21, 1879.

*To all whom it may concern:*

Be it known that I, GEORGE WATKINSON, of New Haven, in the county of New Haven and State of Connecticut, have invented a new Improvement in India-Rubber Boots; and I do hereby declare the following, when taken in connection with the accompanying drawings and the letters of reference marked thereon, to be a full, clear, and exact description of the same, which said drawings constitute part of this specification, and represent, in—

Figure 1:
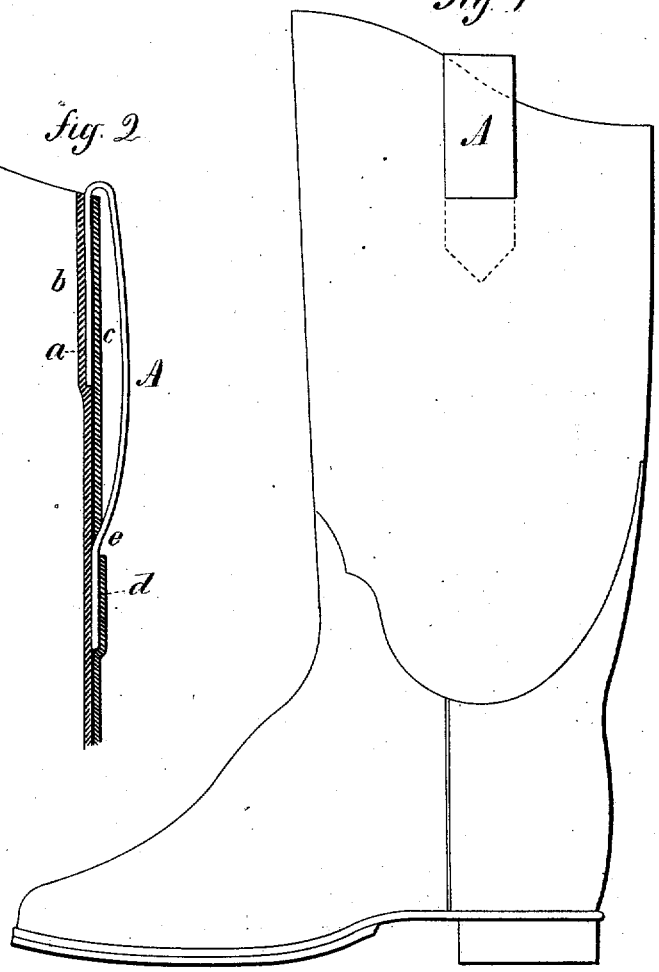
Figure 2:
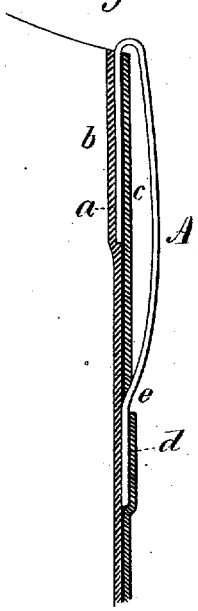

Figure 1, a side view of the boot complete; Fig. 2, a vertical section, enlarged, embodying my invention.

This invention relates to an improvement in the method of attaching straps to india-rubber boots, it being an improvement upon the method for which Letters Patent were granted to this applicant dated July 9, 1878, No. 205,932. In that invention a difficulty is liable to be experienced when the straps are not applied to the boot-leg until after the india-rubber has stood for some length of time, so as to become dried and less adhesive than when in its fresher condition. In such cases the straps are liable to peel off from the leg.

The object of this invention is to overcome this difficulty; and it consists in the method of attaching the strap, as more fully hereinafter described.

The strap is prepared in substantially the same way as in the before-mentioned patent, or any other desirable construction of strap suitable for attachment to the boot may be employed. One end, *a*, of the strap is introduced between the lining *b* and the outer rubber covering, *c*, and caused to adhere thereto in the usual manner. It is then doubled short down to form the loop A, and the other end, *d*, passed through a slit, *e*, in the leg, and between the lining and the outer portion, as seen in Fig. 2. This gives to the strap all the advantages of being secured at both top and bottom, and in a condition not inconvenient to the wearer, but more convenient than the usual loose strap.

The lower end of the strap may be applied to the outside of the leg, and not introduced between that and the lining through the slit *e*; but the slit and introduction are preferable.

Rivets may be introduced at both the upper and lower points, or either of them, if desirable.

I claim—

The herein-described improvement in the manufacture of rubber boots, consisting of a strap for pulling on the boot, one end of which is secured to the leg at the top between the lining and outer covering, and the other end turned down and secured, all substantially as shown and described.

GEORGE WATKINSON.

Witnesses:

JOS. C. EARLE,

J. H. SHUMWAY.